US008346763B2

(12) United States Patent
Chien et al.

(10) Patent No.: US 8,346,763 B2
(45) Date of Patent: Jan. 1, 2013

(54) RANKING METHOD USING HYPERLINKS IN BLOGS

(75) Inventors: Steve Chien, Mountain View, CA (US); Dennis Fetterly, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 1159 days.

(21) Appl. No.: 11/694,462

(22) Filed: Mar. 30, 2007

(65) Prior Publication Data

US 2008/0243812 A1  Oct. 2, 2008

(51) Int. Cl.
*G06F 7/00* (2006.01)
*G06F 17/30* (2006.01)

(52) U.S. Cl. .......... 707/722; 707/723; 707/735; 706/12; 706/13; 706/14

(58) Field of Classification Search .......... 707/600–831, 707/899, 999.001–999.206
See application file for complete search history.

(56) References Cited

U.S. PATENT DOCUMENTS

| | | | |
|---|---|---|---|
| 7,028,026 B1 | 4/2006 | Yang et al. | |
| 2004/0024752 A1 | 2/2004 | Manber et al. | |
| 2005/0060297 A1 | 3/2005 | Najork | |
| 2005/0149502 A1* | 7/2005 | McSherry | 707/3 |
| 2005/0262050 A1 | 11/2005 | Fagin et al. | |
| 2006/0059132 A1 | 3/2006 | Zhang | |
| 2006/0064411 A1 | 3/2006 | Gross et al. | |
| 2006/0069663 A1* | 3/2006 | Adar et al. | 707/1 |
| 2006/0218146 A1 | 9/2006 | Bitan et al. | |
| 2006/0230035 A1 | 10/2006 | Bailey et al. | |
| 2006/0253584 A1* | 11/2006 | Dixon et al. | 709/225 |
| 2007/0011155 A1 | 1/2007 | Sarkar | |
| 2007/0016563 A1* | 1/2007 | Omoigui | 707/3 |
| 2007/0061297 A1* | 3/2007 | Bihun et al. | 707/3 |
| 2007/0094285 A1* | 4/2007 | Agichtein et al. | 707/101 |
| 2007/0100875 A1* | 5/2007 | Chi et al. | 707/102 |
| 2007/0174255 A1* | 7/2007 | Sravanapudi et al. | 707/3 |
| 2007/0185858 A1* | 8/2007 | Lu et al. | 707/5 |
| 2007/0192369 A1* | 8/2007 | Gross | 707/104.1 |
| 2007/0198342 A1* | 8/2007 | Collison et al. | 705/14 |
| 2007/0203891 A1* | 8/2007 | Solaro et al. | 707/3 |
| 2007/0208613 A1* | 9/2007 | Backer | 705/10 |
| 2008/0091672 A1* | 4/2008 | Gloor | 707/5 |

OTHER PUBLICATIONS

Fujimora et al, "The EigenRumor Algorithm for Ranking Blogs," http://www.blogpulse.com/papers/2005/fujimura.pdf, May 10-14, 2005.
Baeza—Yates and Emilio Davis, "Web Page Ranking using Link Attributes," http://delivery.acm.org/10.1145/1020000/1013459/p328-baeza-yates.pdf?key1=1013459&key2=1027370711&coll=GUIDE&dl=GUIDE&CFID=10717875&CFTOKEN=17634948, May 17, 2004.
S . Brin and L. Page, "The Anatomy of a Large-Scale Hypertextual Web Search Engine," http://wx.bsjh.tcc.edu.tw/~12003013/wiki/images/8/8f/Anatomy.pdf, Apr. 14-18, 1998.

* cited by examiner

*Primary Examiner* — Angelica Ruiz
(74) *Attorney, Agent, or Firm* — Vierra Magen Marcus & DeNiro LLP (57) ABSTRACT

A method for static ranking of web documents is disclosed. Search engines are typically configured such that search results having a higher PageRank® score are listed first. A modified scoring technique is provided whereby the score includes a reset vector that is biased toward web pages linked to blogs. This requires identifying web pages as either blogs or non-blogs.

17 Claims, 9 Drawing Sheets

RANKING METHOD USING HYPERLINKS IN BLOGS

BACKGROUND

The proliferation of the World Wide Web has made enormous amounts of information available through the Internet, and numerous search engines are available to help users sort through the information. For example, a user will choose a search service and then enter a query. The search service accepts the query and returns a result list of documents or links that satisfy the query. It is desirable that the list of results be ordered such that documents and/or links that are most relevant to the user's query appear first, and search engines typically include one or more algorithms to provide some sort of ranking of the search results for the user.

Ranking algorithms may be classified as query-dependent (also called dynamic) or query-independent (also called static). Query-dependent ranking algorithms use the terms in the query while query-independent algorithms do not. Query-independent ranking algorithms assign a quality score to each document on the web. Therefore, query-independent ranking algorithms can be run ahead of time and need not be rerun whenever a user submits a query.

Ranking algorithms may also be broadly classified into content-based, usage-based, and link-based ranking algorithms. Content-based ranking algorithms use the words in a document to rank the document among other documents. For example, a query-dependent content-based ranking algorithm could assign higher scores to documents that contain the query terms in the beginning of a document or in a prominent font. Usage-based ranking algorithms assign a score based on an estimate of how often the documents are viewed, for example, by examining web proxy logs or monitoring click-through on the results pages of the search engine. Link-based ranking algorithms use the hyperlinks between web pages to rank web pages. For example, a static link-based ranking algorithm could assign a score to each web page that is proportional to the number of links pointing to that page, based on the notion that links pointing to a page are actually an endorsement of the page.

PageRank® is a well-known and commonly used query-independent link-based ranking algorithm. Assume that the set of known web pages and links between them induces a graph with vertex set V, where each vertex corresponds to a web page, and edge set E, where each directed edge (u,v) corresponds to a hyperlink from page u to page v. Let O(u) denote the outdegree of vertex u, i.e., the number of hyperlinks embedded in web page u, and let d be a number between 0 and 1, e.g., 0.15. The PageRank vector R is a vector whose values R(v) satisfy the following equation, which are normalized to have a total sum of 1. Note that a page having an outdegree of 0 will need to be handled as a special case.

$$R(v) = \frac{d}{|V|} + (1-d) \sum_{(u,v) \in E} \frac{R(u)}{O(u)}$$

The PageRank formula is often explained as follows. Consider a web surfer who is performing a random walk on the web. At every step along the walk, the surfer moves from one web page to another, using the following algorithm. With some probability d, the surfer selects a web page uniformly at random and jumps to it; otherwise, the surfer selects one of the outgoing hyperlinks in the current page uniformly at random and follows it. Because of this metaphor, the number d is sometimes called the "jump probability," namely the probability that the surfer will jump to a completely random page. If the web surfer jumps with probability d and there are |V| web pages, the probability of jumping to a particular page is d/|V|. Since any page can be reached by jumping, every page is guaranteed a score of at least d/|V|. The PageRank of a particular web page is then the fraction of time that the random surfer will spend at that page.

PageRank scores may be used to rank query results. A search engine employing PageRank will rank pages with high PageRank scores higher than those with low scores, assuming that everything else is the same. Since most users of search engines tend to examine only the first few results, operators of commercial web sites would certainly prefer that links to their sites appear early in the result listing, that is, that their web pages receive high PageRank scores. Thus, commercial web site operators clearly have an incentive to try and artificially increase the PageRank scores of the pages on their web sites.

One way to increase the PageRank score of a web page v is by having many other pages link to it. If all of the pages that link to web page v have low PageRank scores, each individual page would appear to contribute very little to the PageRank score of page v. However, since every linking page is guaranteed to have a minimum PageRank score of d/|V|, links from many such low quality pages can still inflate the PageRank score.

In practice, the vulnerability of PageRank to artificial inflation of scores is being exploited by web sites that contain a very large set of pages whose only purpose is to "endorse" a main home page. Typically, these endorsing pages contain a link to the page that is to be endorsed, and one or more links to other endorsing pages. Once a web crawler has stumbled across any of the endorsing pages, it continues to download more endorsing pages since the endorsing pages link to other endorsing pages, thereby accumulating a large number of endorsing pages. This large number of endorsing pages, all of them endorsing a single page, artificially inflates the PageRank score of the page that is being endorsed.

This problem was addressed and partially solved in U.S. Patent Publication No. 2005/0060297 entitled Systems And Methods For Ranking Documents Based Upon Structurally Interrelated Information, where the PageRank technique was modified to provide resistance to link spam by giving more weight to hosts/domains/servers that contain many web pages.

However, it remains desirable to find improved query-independent link-based ranking techniques. In particular, such techniques should significantly reduce the effects of artificially created endorsement links, and reduce the incentive for creating such links for the purpose of inflating PageRank scores.

SUMMARY

The present disclosure describes a method for static ranking of search results. Search engines are typically configured such that search results having a higher ranking or score are listed first. This disclosure is directed to a modified scoring technique whereby the score is biased toward web pages linked to blogs. The notion is that blogs still represent human created content, and that links from blogs are genuine endorsements of the target web page.

As a preliminary matter, web pages must be classified as either blog or non-blog. This may be accomplished, for example, by web crawling using predefined criteria that has been shown to evidence blogs, such as (i) whether a page is hosted in a known blog hosting DNS domain; (ii) whether features from non-HTML markup words and phrases are contained in the page; (iii) whether targets of outgoing links are in the page; and (iv) whether the string "blog" occurs in the URL.

After classifying web pages, a search engine is used to formulate a query, and results are returned in an order determined by the ranking or scoring mechanism. In this disclosure, the scoring mechanism is modified to exhibit a bias toward web pages that are linked to by blogs. Specifically, the well known PageRank® scoring mechanism is modified such that its reset vector incorporates a bias toward web pages that are linked to by blogs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The present disclosure describes a method for ranking search results by incorporating a bias toward data obtained from blogs.

The conventional PageRank® algorithm takes on the audacious task of condensing every page on the Web into a single number, its PageRank score. Thus, PageRank is a global ranking of all Web pages, regardless of their content, based solely on their location in the Web's graph structure. Using the conventional PageRank technique, search results are ordered so that more important Web pages are given preference. The intuition behind PageRank is that it uses information which is external to the Web pages themselves—their backlinks—which provide a kind of peer review. Furthermore, backlinks from "important" pages are considered more significant than backlinks from average links by recursive definition.

It is also known that personalized PageRank scores can create a view of the Web from a particular perspective, e.g., by taking a user's bookmarks and inflating the PageRank scores of those pages in the user's bookmarks. However, personalized PageRank does not explicitly deal with the problem of link spamming because there is still a minimum score associated with each link spam Web page. Accordingly, a link spammer can still create (automatically, if desired) a multitude of Web pages on a single Web server, each having their own minimum PageRank score, that artificially inflate the score of a target Web page by endorsing each other and the target page.

One of ordinary skill in the art can appreciate that the techniques disclosed herein can be implemented in connection with any computer or other client or server device, which can be deployed as part of a computer network, or in a distributed computing environment. In this regard, the present disclosure pertains to any computer system or environment having any number of memory or storage units, and any number of applications and processes occurring across any number of storage units or volumes, which may be used in connection with processes for ranking documents in accordance with the present disclosure. The present disclosure may apply to an environment with server computers and client computers deployed in a network environment or distributed computing environment, having remote or local storage. The present disclosure may also be applied to standalone computing devices having programming language functionality, and interpretation and execution capabilities for generating, receiving and transmitting information in connection with remote or local services. Downloading and analyzing Web pages is particularly relevant to those computing devices operating in a network or distributed computing environment, and thus the ranking algorithms and techniques in accordance with the present disclosure can be applied with great efficacy in those environments.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may implicate the ranking techniques and processes of the disclosure.

Figure 1:
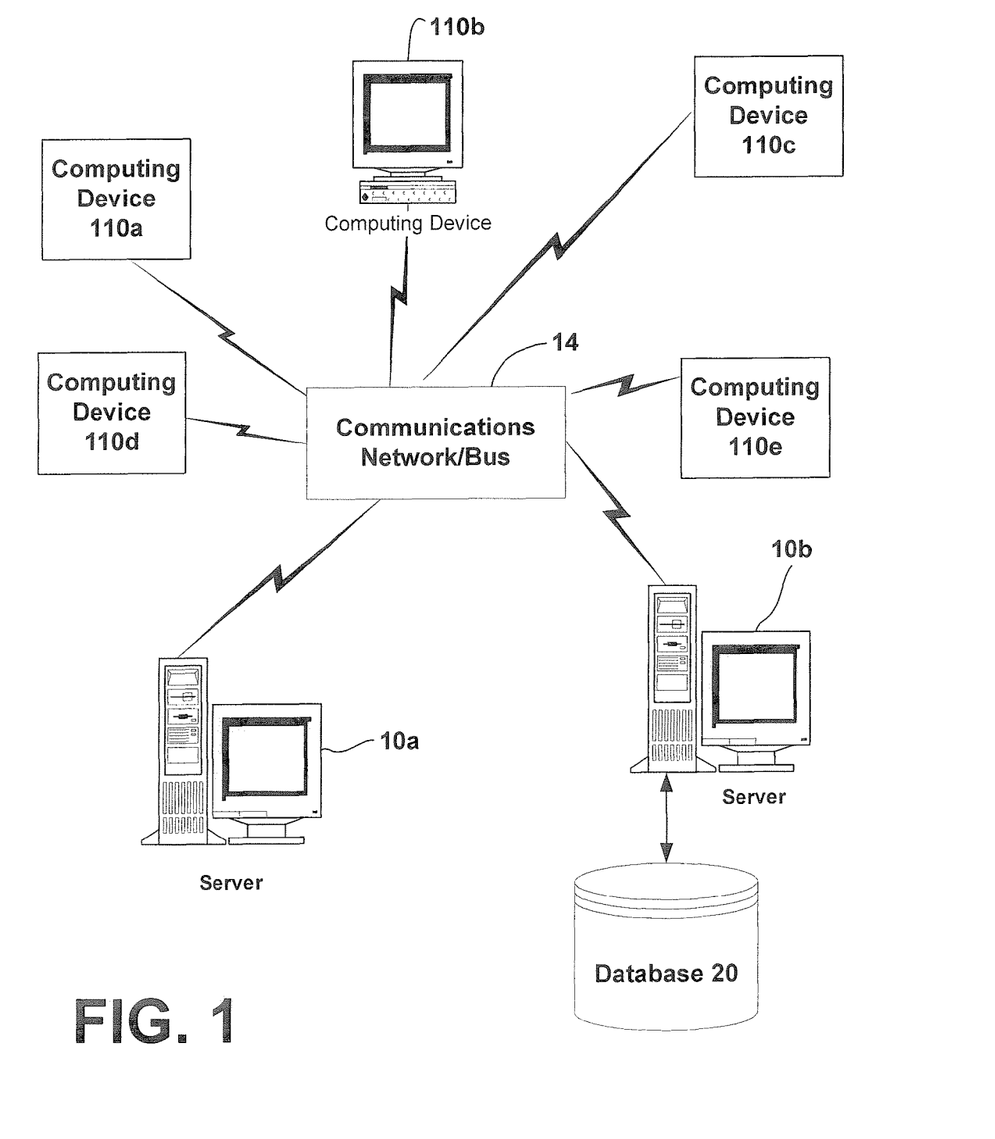
FIG. 1 is a block diagram illustrating one embodiment of a typical network environment.

FIG. 1 illustrates an exemplary networked or distributed environment, with a server in communication with client computers via a network/bus, in which the techniques of the present disclosure may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present disclosure. It is thus contemplated that the present disclosure may apply to any computing device in connection with which it is desirable to implement query-independent, link-based document ranking techniques.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to techniques of the present disclosure. Thus, the present disclosure can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 2:
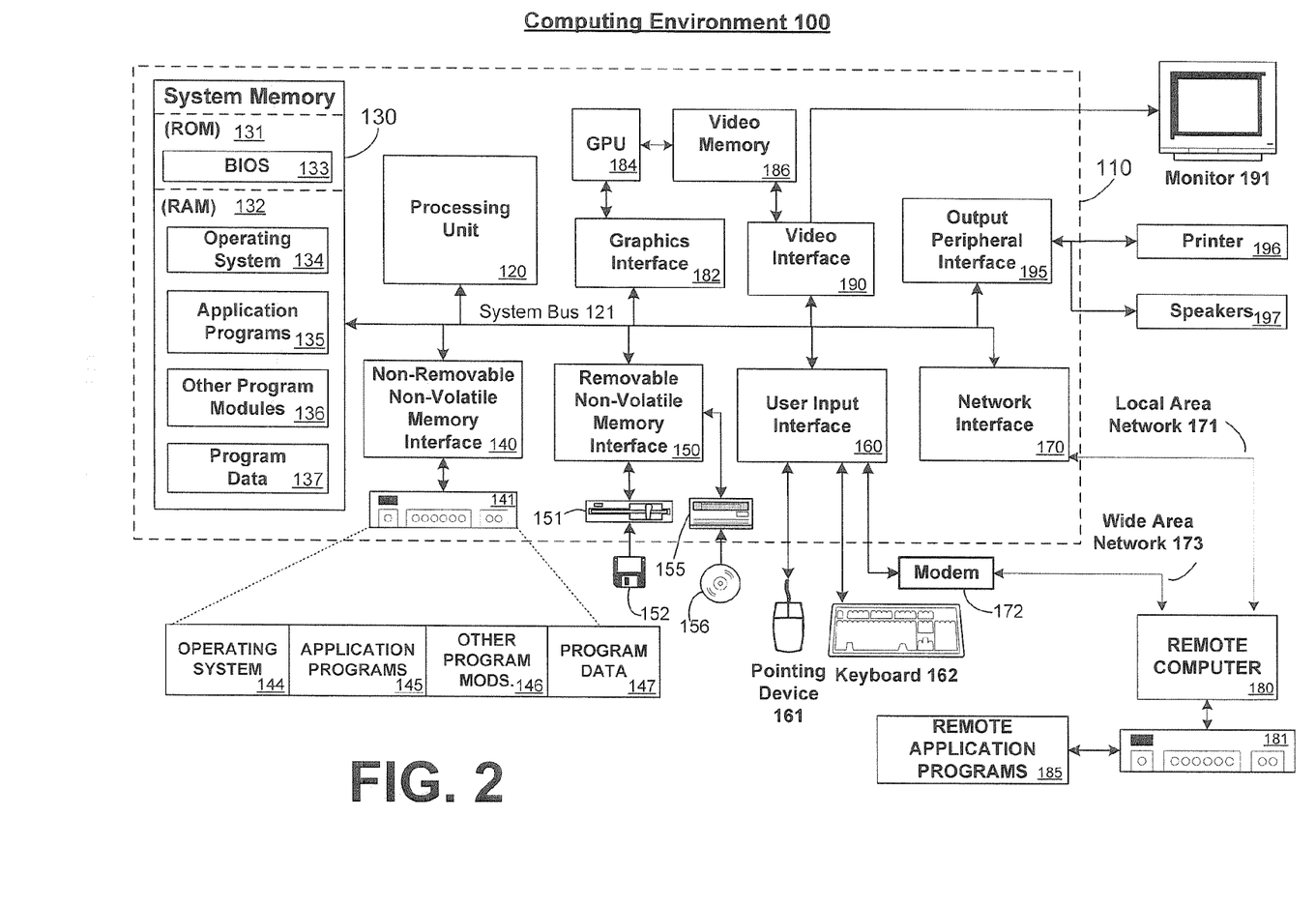
FIG. 2 is a block diagram illustrating one embodiment of a typical computing environment.

FIG. 2 and the following discussion are intended to provide a brief general description of a suitable computing environment in connection with which the techniques of the present disclosure may be implemented. It should be understood, however, that handheld, portable and other computing devices and computing objects of all kinds are contemplated for use in connection with the present disclosure, i.e., anything that interfaces with Web pages or other structurally interrelated documents in a computing environment. While a general purpose computer is described below, this is but one example, and the present disclosure may be implemented with a thin client having network/bus interoperability and interaction. Thus, the techniques of the present disclosure may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the ranking techniques in accordance with this disclosure.

Although not required, the techniques of this disclosure can be implemented via an operating system, for use by a developer of services for a device or object, and/or included within application software that operates in connection with the ranking techniques of the disclosure. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the techniques of this disclosure may be practiced with other computer system configurations and protocols. Other well known computing systems, environments, and/or configurations that may be suitable for use with the disclosure include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The techniques of this disclosure may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2 thus illustrates an example of a suitable computing system environment 100 in which the techniques of the disclosure may be implemented, although as made clear above, the computing system environment 100 is only one example of a suitable computing environment and is not intended to suggest any limitation as to the scope of use or functionality of the disclosed subject matter. Neither should the computing environment 100 be interpreted as having any dependency or requirement relating to any one or combination of components illustrated in the exemplary operating environment 100. Any of the devices illustrated in FIG. 1 could be implemented in the computing environment shown by FIG. 2.

With reference to FIG. 2, an exemplary system for implementing the present ranking techniques includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the disclosed ranking techniques may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods may be included in, supported in or accessed via all of the languages and services enabled by managed code, such as .NET code, and in other distributed computing frameworks as well.

In order to utilize the modified technique for ranking that is biased toward blogs, a method must be used to identify web pages as blogs. This can be done by enabling a web crawler to perform a series of focused or general web crawls. For example, certain features have been identified that are useful for determining the classification of a web page, and these features could be used as part of a web crawling strategy. These features are generally organized into four categories: (i) whether a page is hosted in a known blog hosting DNS domain; (ii) features from the non-HTML markup words and phrases contained in the page; (iii) the targets of outgoing links in the page; and (iv) whether the string "blog" occurs in the URL. In addition, human judgments of results from the web crawl can be used as input to the web crawler strategy to improve the probability that web pages could be identifies as blogs.

As described briefly above, the conventional PageRank algorithm assigns a numerical weight to each element in a hyperlinked set of documents, such as the world wide web. Given the adjacency matrix W of a web graph on n pages, in which $w_{ij}=1$ if there exists a link from page i to page j in the web, the algorithm first obtains a stochastic matrix M by dividing each row of matrix W by its row sum, treating pages with zero outdegree as a special case. The algorithm then defines the PageRank Markov chain with transition matrix:

$$P=(1-\epsilon)M+\epsilon U,$$

where U is the uniform transition matrix with $u_{ij}=1/n$ for all i, j, and $\epsilon$ is a fixed constant, usually between 0.1 and 0.2. (By thinking of U as the matrix in which each row is $u=(1/n, \ldots, 1/n)$, we can say that u is the reset vector for this version of PageRank.) The PageRank of a particular web page is its stationary probability in P. One popular interpretation of this envisions a random surfer who walks across the web, usually by choosing a random outgoing link from her current page at each step, but sometimes (with probability $\epsilon$) selecting a page uniformly at random from the entire web. In this case, the PageRank of a page is the probability that the random surfer will be at that page at any time step.

Figure 3:
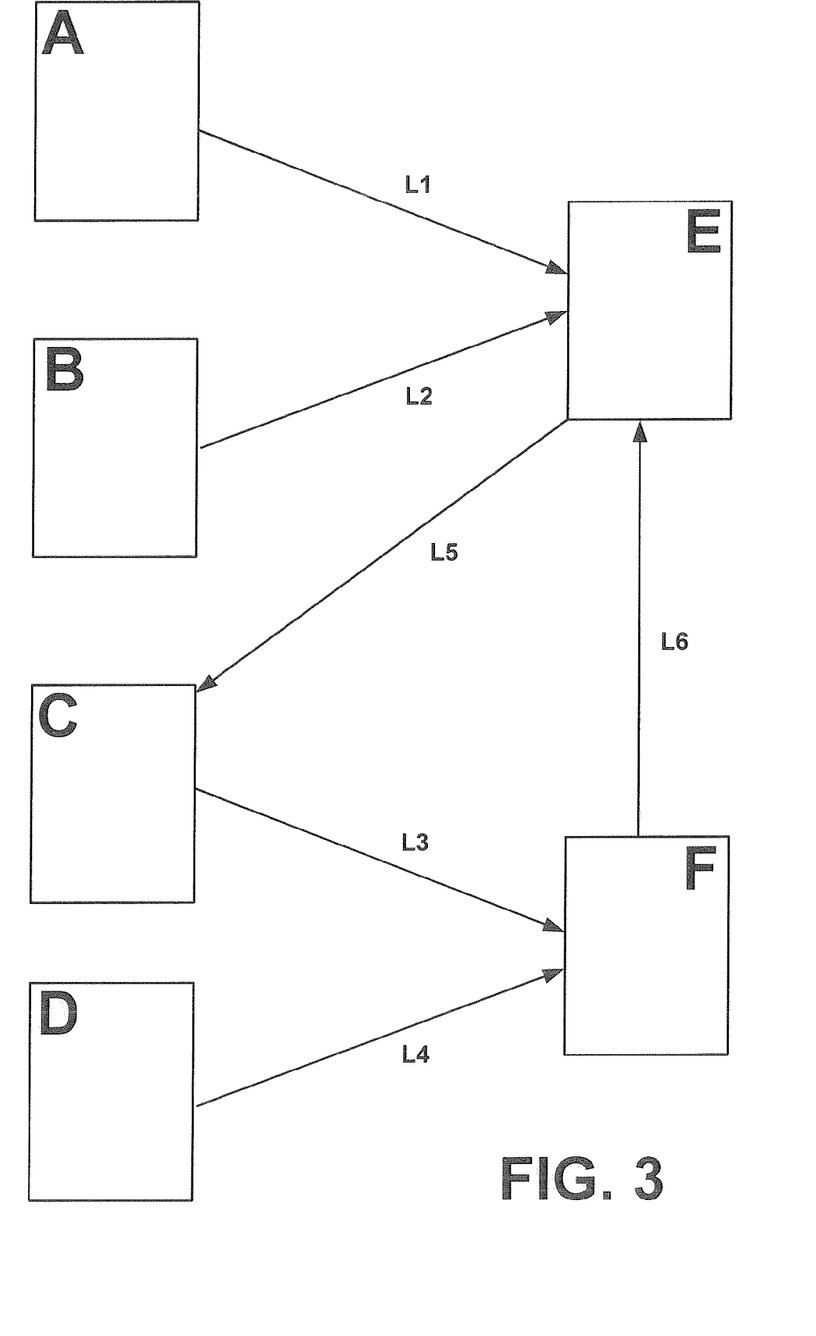
FIG. 3 is a block diagram illustrating web pages having links pointing to other web pages.

Referring now to FIG. 3, an illustrative example is provided in which $\epsilon=0$. Six web pages are illustrated (pages A-F) with arrows representing links pointing to other web pages. Thus, pages A and B have links L1 and L2 pointing to page E. Pages C and D have links L3 and L4 pointing to page F. Page E includes link L5 pointing to page C, and page F includes link L6 pointing to page E. Using the conventional PageRank technique, each link is assigned equal weight, and an iterative process is performed until the PageRank score converges.

Initially, all pages have the same probability of being landed on by the user, namely ⅙ (since there are six pages). However, for the first ranking iteration, each page sends its probability along to the linked page to be summed. Thus, since page E has three links pointing to it from pages A, B and F, those probabilities are added, resulting in a probability of ½ for page E. Since page F has two links pointing to it from pages C and D, those probabilities are added, resulting in a probability of ⅓ for page F. Since page C has one link pointing to it from page E, that probability is passed on, resulting in a probability of ⅙ for page C. On the next iteration, the probability of ½ is passed along from page F to page C; the probability of ⅙ is passed along from page C to page E; and the probability of ⅓ is passed along from page E to page F. Since the links only point to pages C, E and F, these probabilities will keep circling among just these pages.

A key assumption behind the early success of the PageRank technique is that a link on the web represents an endorsement of the target page by the presumably human author of the source page. Over time, however, this assumption has become less valid. Not only is there now a large quantity of automatically generated web content, but the success of the PageRank technique has led to the widespread deployment of measures to artificially boost the PageRank of a given web page.

One frequently exploited characteristic of PageRank is its uniform reset vector u, which has the effect of giving each of the n pages on the web an equal endorsement power. For the example just described with reference to FIG. 3, a reset vector was not applied. If a conventional reset vector is applied, then the probabilities are redistributed mostly to the linked pages, but some percentage (e.g., $\epsilon=10\%$) is passed on to all pages uniformly. For example, assuming that there are six web pages as illustrated in FIG. 3, then the initial probability of landing on any one of the pages is still ⅙. For the first iteration, however, a large percentage of the probabilities (e.g., $1-\epsilon=90\%$) will be passed along the links, but some small percentage (e.g., $\epsilon=10\%$) will be passed to all other pages even though they are not linked. Thus, for example, since page E is linked from pages A, B and F, 90% of the probabilities from pages A, B and F will be passed onto page E, but 10% of the probabilities from pages A, B and F will be passed to all six pages. This first iteration is summarized in Table I.

TABLE I

| | From A | From B | From C | From D | From E | From F |
|---|---|---|---|---|---|---|
| A | 10% * (⅙)/6 | 10% * (⅙)/6 | 10% * (⅙)/6 | 10% * (⅙)/6 | 10% * (⅙)/6 | 10% * (⅙)/6 |
| B | 10% * (⅙)/6 | 10% * (⅙)/6 | 10% * (⅙)/6 | 10% * (⅙)/6 | 10% * (⅙)/6 | 10% * (⅙)/6 |
| C | 10% * (⅙)/6 | 10% * (⅙)/6 | 10% * (⅙)/6 | 10% * (⅙)/6 | 90% * (⅙) + 10% * (⅙)/6 | 10% * (⅙)/6 |
| D | 10% * (⅙)/6 | 10% * (⅙)/6 | 10% * (⅙)/6 | 10% * (⅙)/6 | 10% * (⅙)/6 | 10% * (⅙)/6 |
| E | 90% * (⅙) + 10% * (⅙)/6 | 90% * (⅙) + 10% * (⅙)/6 | 10% * (⅙)/6 | 10% * (⅙)/6 | 10% * (⅙)/6 | 90% * (⅙) + 10% * (⅙)/6 |
| F | 10% * (⅙)/6 | 10% * (⅙)/6 | 90% * (⅙) + 10% * (⅙)/6 | 90% * (⅙) + 10% * (⅙)/6 | 10% * (⅙)/6 | 10% * (⅙)/6 |

It can thus be seen that an agent or commercial operator could generate a very large number of web pages that reference a target page, thereby boosting the PageRank score of the target page. One countermeasure is to use a non-uniform reset vector b that is weighted towards pages that are perceived to be trustworthy. The key question is how to appropriately choose the non-uniform reset vector b.

This disclosure explores the idea of biasing the reset vector u toward pages that are linked to by blogs. This idea is based on the assumption (or hope) that blogs are still mostly human-authored, and that links from blogs generally represent sincere endorsements on the part of the authors. If this is true, then the resulting stationary distribution would tend to avoid pages that are ranked highly by the traditional PageRank technique due to link spam or automatically generated content. Specifically, the following reset vectors were evaluated:

b*, where b*$_i$ is equal to 1/|B| if page i is linked to by a blog, where B is equal to the set of pages linked to by blogs, and zero otherwise;

b$^{10}$, where b$^{10}_i$ is equal to 1/|B$_{10}$| if page i is linked to by a blog ranked in the top 10% of all blogs (as determined from the traditional PageRank technique), where B$_{10}$ is equal to the set of pages linked to by all such blogs, and zero otherwise;

b$^1$, where b$^1_i$ is equal to 1/|B$_1$| if page i is linked to by a blog ranked in the top 1% of all blogs (as determined from the traditional PageRank technique), where B$_1$ is equal to the set of pages linked to by all such blogs, and zero otherwise;

By choosing this range of reset vectors, a better understanding might be obtained of which is more helpful: considering the links from a small, high-quality set of blogs, or the (more numerous) links from a larger set of blogs.

Evaluating the effectiveness of this approach requires two steps. First, a large web graph must be assembled on which reset vectors can be defined and a modified Page-Rank can be computed. Second, the resulting rank vectors must be evaluated for relevance.

As noted above, a large focused crawl was performed aimed at gathering blogs, and a large general web crawl was also performed that downloaded over 472 million pages (including redirects) and inferred the existence of more than 6 billion additional pages based on links contained in the downloaded set. A web graph was then constructed on the union of these two sets of pages, though note that each page in the second set necessarily has outdegree zero in the graph.

The set B then includes those downloaded pages in the web crawl that were also linked to by any page classified as a blog from our focused crawl. The sets B$_{10}$ and B$_1$ are the subsets of B that include only pages linked to by the top 10% and 1% of top-level blogs, respectively. Of the 472 million downloaded pages, B, B$_{10}$, and B$_1$ cover 53,897,337 pages, 39,400,498 pages, and 21,006,695 pages respectively. The reset vectors b*, b$^{10}$, and b$^1$ were then defined from these sets as described above, and PageRank vectors were computed using power iteration with these reset vectors.

In order to determine if the modified PageRank technique represents an improvement over the traditional PageRank technique, a large set of human-judged web pages is referenced. Specifically, this data set comprises over 66 million result pages that were returned by publicly available search engines to a set of 28,043 randomly selected search queries, of which a subset of 485,656 were judged on a scale from 0 (worst) to 5 (best). Of the large set, 19,664,033 result pages also show up in the web crawl, and of the judged subset, 339,351 are in the crawl.

The metric used to evaluate the modified rankings will be the normalized discounted cumulative gain ("NDCG"), which is tailored for web search in that it gives more weight to the quality of highly ranked pages than lower ones. More specifically, for a ranking r and a parameter k, NDCG$_k$ is defined as follows:

$$NDCG_k(r) = \frac{1}{Z} \sum_{i=1}^{k} \frac{2^{q(r_i)} - 1}{\log(1+i)}$$

where q(r$_i$) is the judged quality (on the scale of 0 to 5 referenced above) of the ith ranked page according to the ranking r, and Z is a normalization constant that makes the maximum possible value 1. Note that the discounting factor is logarithmic, meaning that the weight assigned drops off moderately at first, and very slowly afterwards. The NDCG score of the rankings for the large web crawl when restricted to the result pages was then compared with that produced by the traditional PageRank technique using the uniform reset vector.

Figure 4:
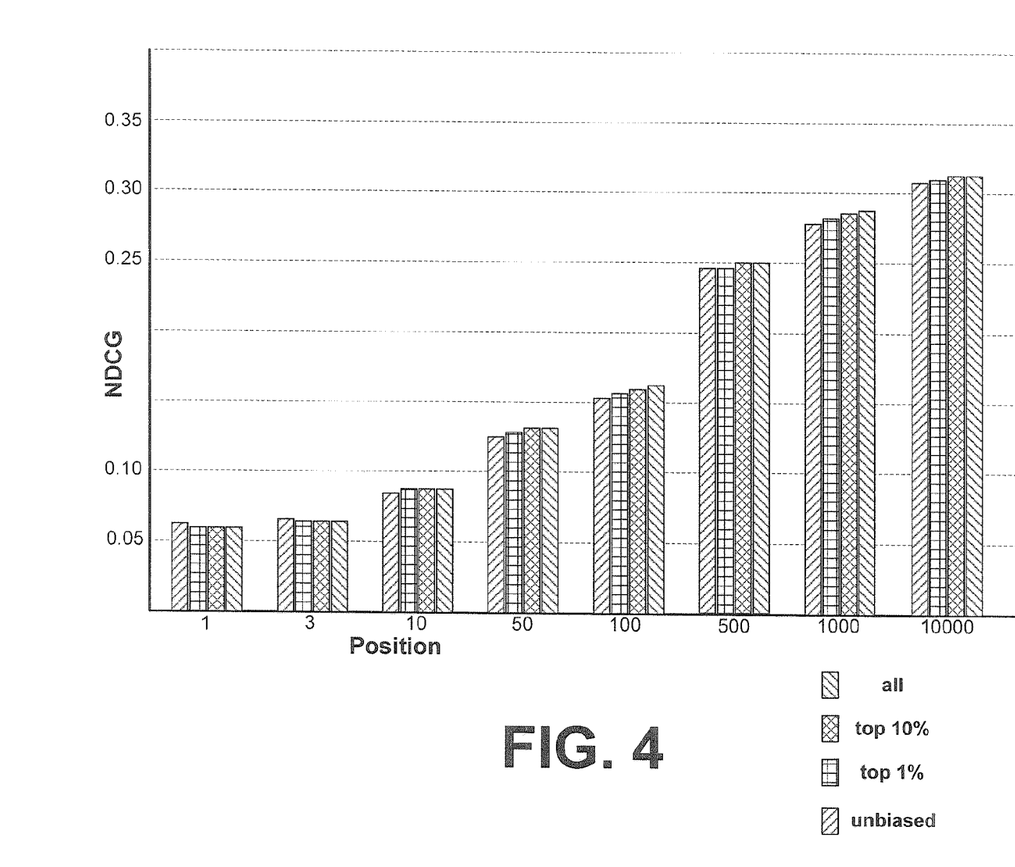
FIG. 4 is a graph illustrating scoring of web pages using conventional and modified ranking techniques.
Figure 5:
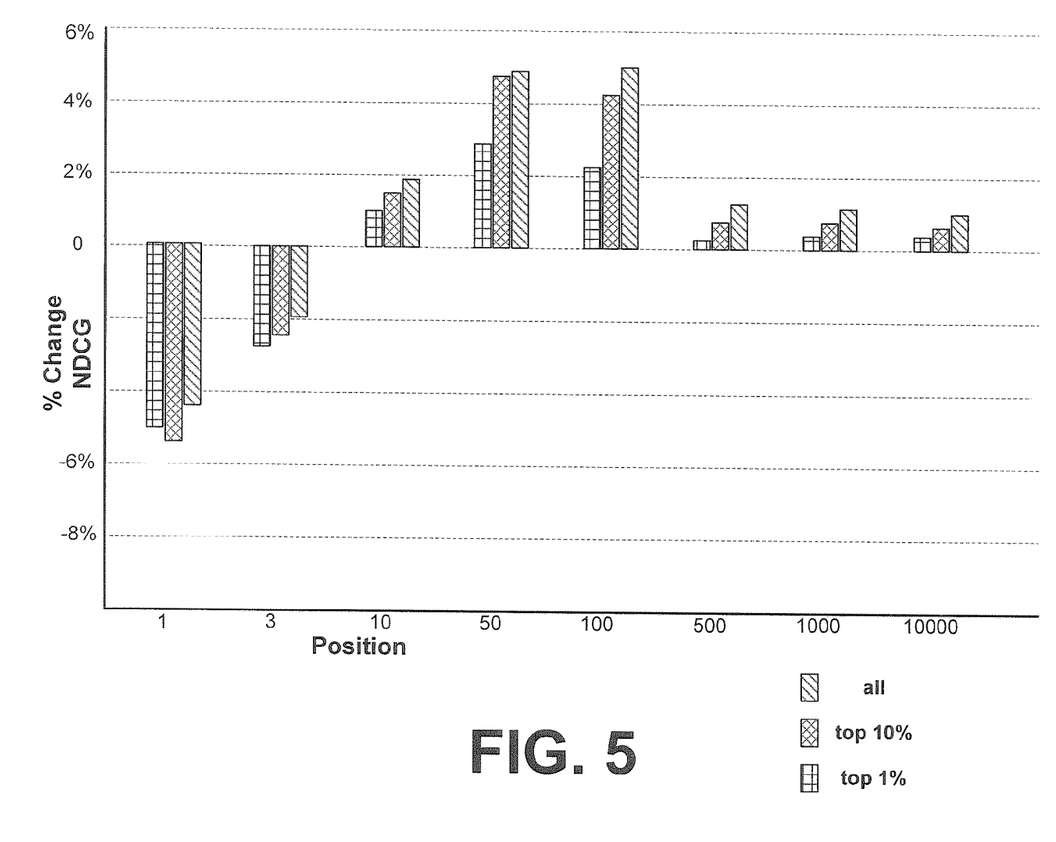
FIG. 5 is a graph illustrating the results of FIG. 4 as percentage changes.

FIG. 4 displays the NDCG scores for the traditional PageRank technique, as well as for the modified PageRank technique when computed using b$^1$, b$^{10}$, and b* as the reset vectors, while FIG. 5 displays the same results viewed as percentage changes.

As FIGS. 4 and 5 show, except for very small values of k, the modified rankings outperform the traditional unbiased PageRank technique, with the largest improvement coming in the middle ranges for 10≦k≦1000, which may be the most meaningful range given the objectives and the available data set. First, since the focus is developing an improved static ranking for search, the goal is to make sure that for any query, the set of results given to the dynamic ranker is as relevant as possible. Hence, the exact order of the top several results is not as crucial as for a dynamic ranking. Second, for very small values of k, NDCG$_k$ is essentially measuring whether a ranking guessed the top-judged 1-3 pages. This is particularly problematic for the data set, where the actual best several pages may be among the 99% of the result pages that are unjudged; a ranking that places these at the top would score poorly according to NDCG.

At first observation, the improvements that the modified reset vectors achieve may seem small. It is worth noting, however, that even small differences in NDCG may be more significant than they appear. To place these in perspective, note that the difference in NDCG between the traditional unbiased PageRank technique and randomly generated results is only 0.08 for k=10 and 0.10 for k=5000.

Figure 6:
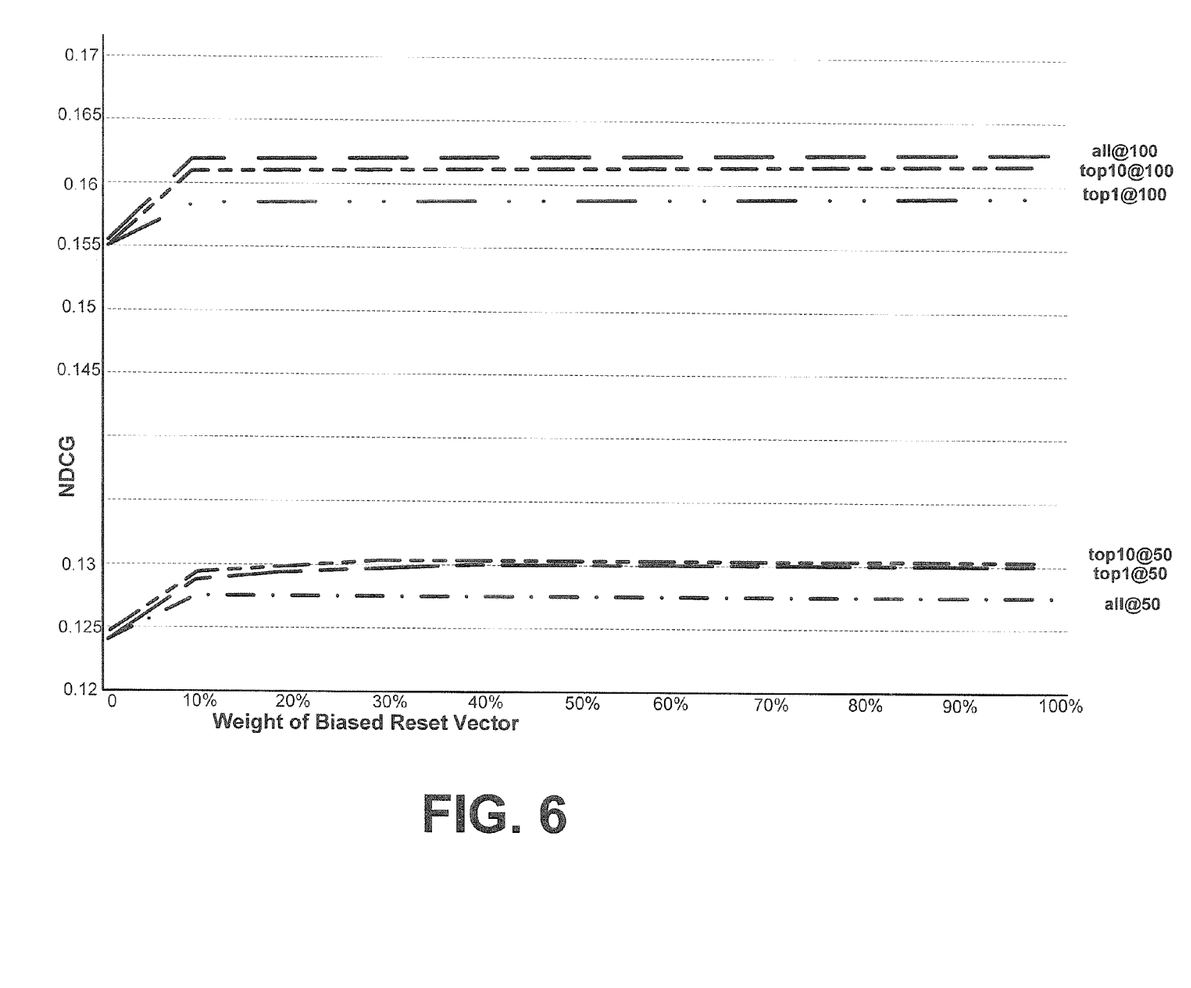
FIG. 6 is a graph illustrating linear combinations of unbiased and biased score distributions.

To further confirm that these improvements are not the result of random noise, a range of new rankings was created by taking linear combinations of the unbiased PageRank stationary distribution and the modified PageRank distributions. Formally, if π is the PageRank vector computed from an unbiased reset vector, and π' is the PageRank vector from a modified reset vector, then new vectors (1−α)π+απ' for 0≦α≦1 are created. If the improvements are insignificant, one might expect the NDCG scores based on the mixed rankings to vary above and below the score obtained by the pure ranking. The results of this experiment are shown in FIG. 6. As can be seen there, the NDCG values are in fact stable and generally monotonically increasing, with much of the improvement coming even for small values of α. This lends credence to the observed improvement.

Perhaps surprisingly, the reset vector that incorporated all pages linked to by blogs performed better than that which used only the top 10% of blogs, which in turn was better than that which used the top 1% of blogs. This is because even links from low-ranked blogs are authentic and thus useful for ranking, which may change as spam blogs become more prevalent.

Other characteristics of the blogs may prove useful in refining the modified technique. For example, the number of subscribers to a particular blog could be evaluated and factored into the iterative process. If a blog has a large number of subscribers, suggesting that a higher endorsement level should be associated with that blog, that then the scoring method could be modified to add weight to such a blog.

Figure 7:
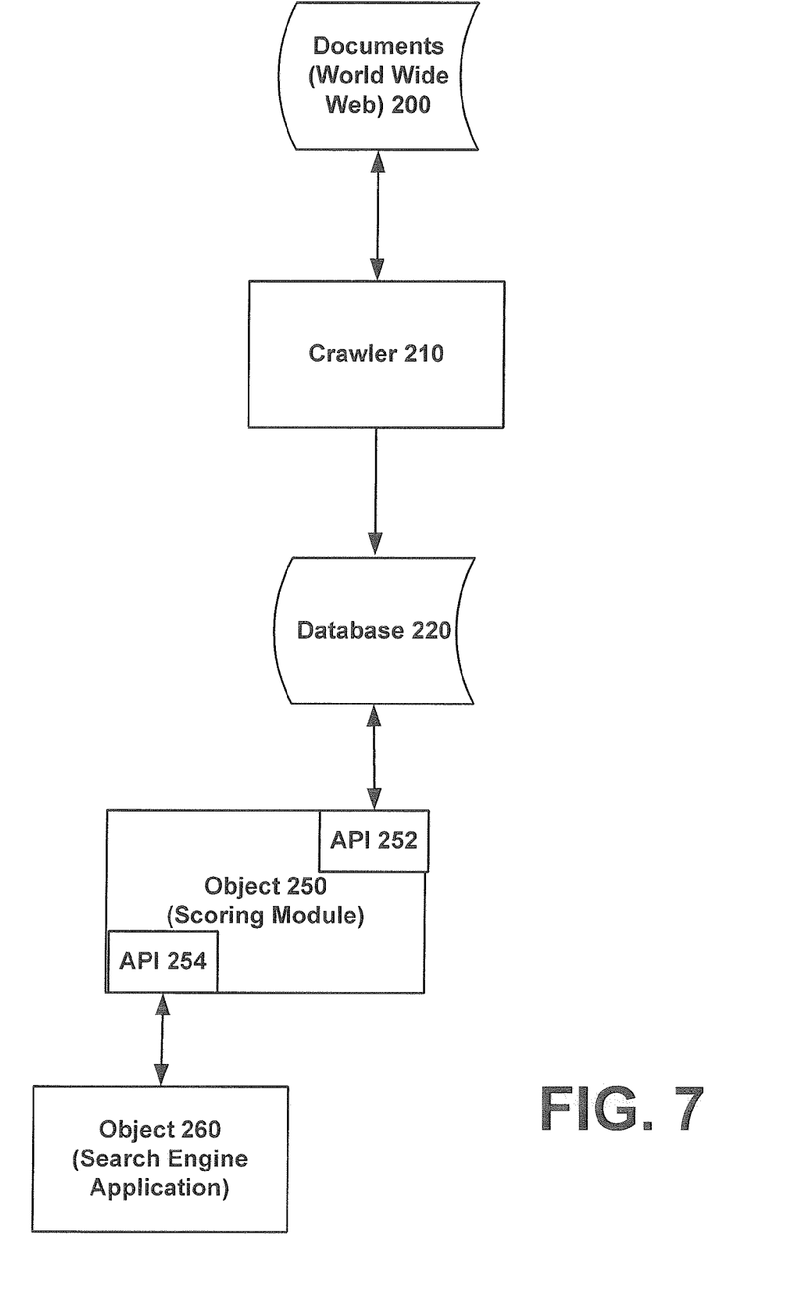
FIG. 7 is a block diagram illustrating the use of a modified ranking technique.

FIG. 7 is a block diagram illustrating a system for using the modified technique to rank web documents. Since the technique is query independent, the ranking process can be run independent of the application that requests documents and scores, e.g., the search engine. For example, one or more web crawlers 210 can be used to crawl a source of documents 200, such as the World Wide Web, and to retrieve and collect the documents or information about the documents for storage in database 220. At any point in time that some number of documents have been stored in database 220, the modified technique can be applied to assign a score to the documents. Thus, scoring object 250 contains all the routines and instructions necessary to assign a score, and is accessible through API 252. Once an initial repository of documents and scores has been generated, which can happen iteratively, continuously, or be periodically updated, an application such as search engine 260 can be run. The search engine 260 receives a query from a user and interfaces with the scoring object 250 through API 252. The scoring object 250 retrieves and orders relevant web pages from the database 220 via API 252, then returns the ordered list of results to the search engine 260.

Figure 8:
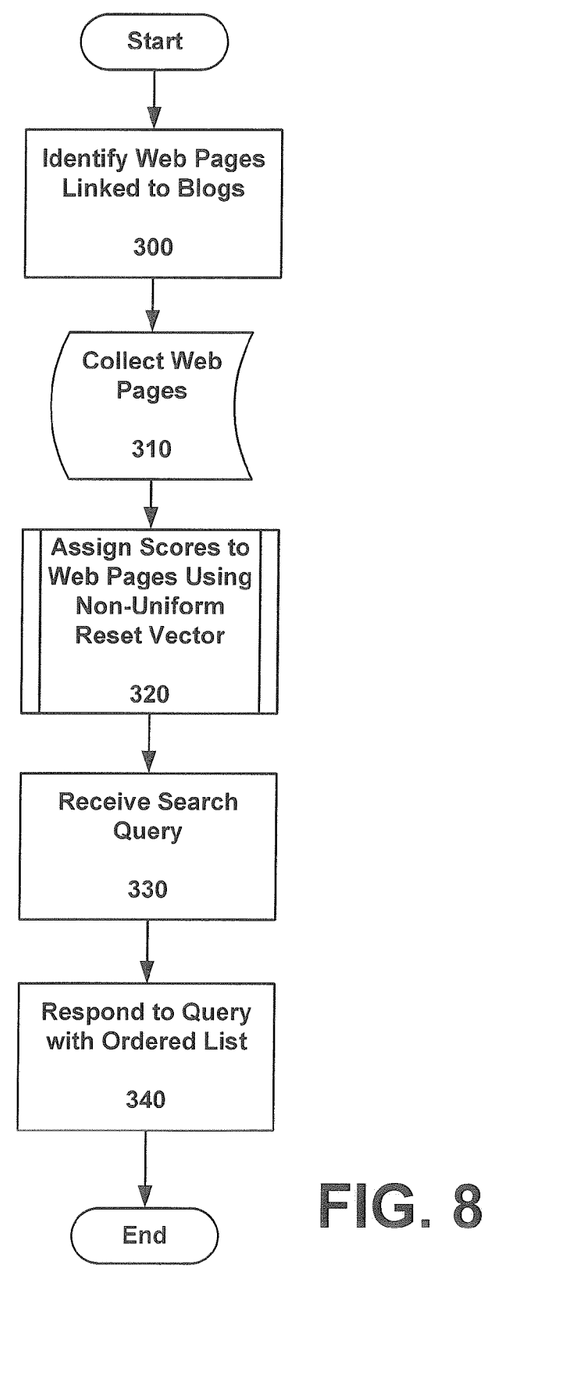
FIG. 8 is a flow chart illustrating a process for responding to user search queries.

FIG. 8 is a flow chart illustrating a process for responding to user queries. In step 300, relevant web pages are identified. In step 310, the relevant web pages are collected and stored. As discussed above, the relevant web pages are those which are linked to by one or more blogs. In step 320, scores are assigned to the collected web pages using a PageRank technique that has been modified to have a non-uniform reset vector. Further detail regarding the modified technique is provided in the description of FIG. 9. As noted above, steps 300-320 need not be performed concurrently with the subsequent steps. In step 330, query results are received from a search engine. In step 340, a response is provided in the form of an ordered list of web pages.

Figure 9:
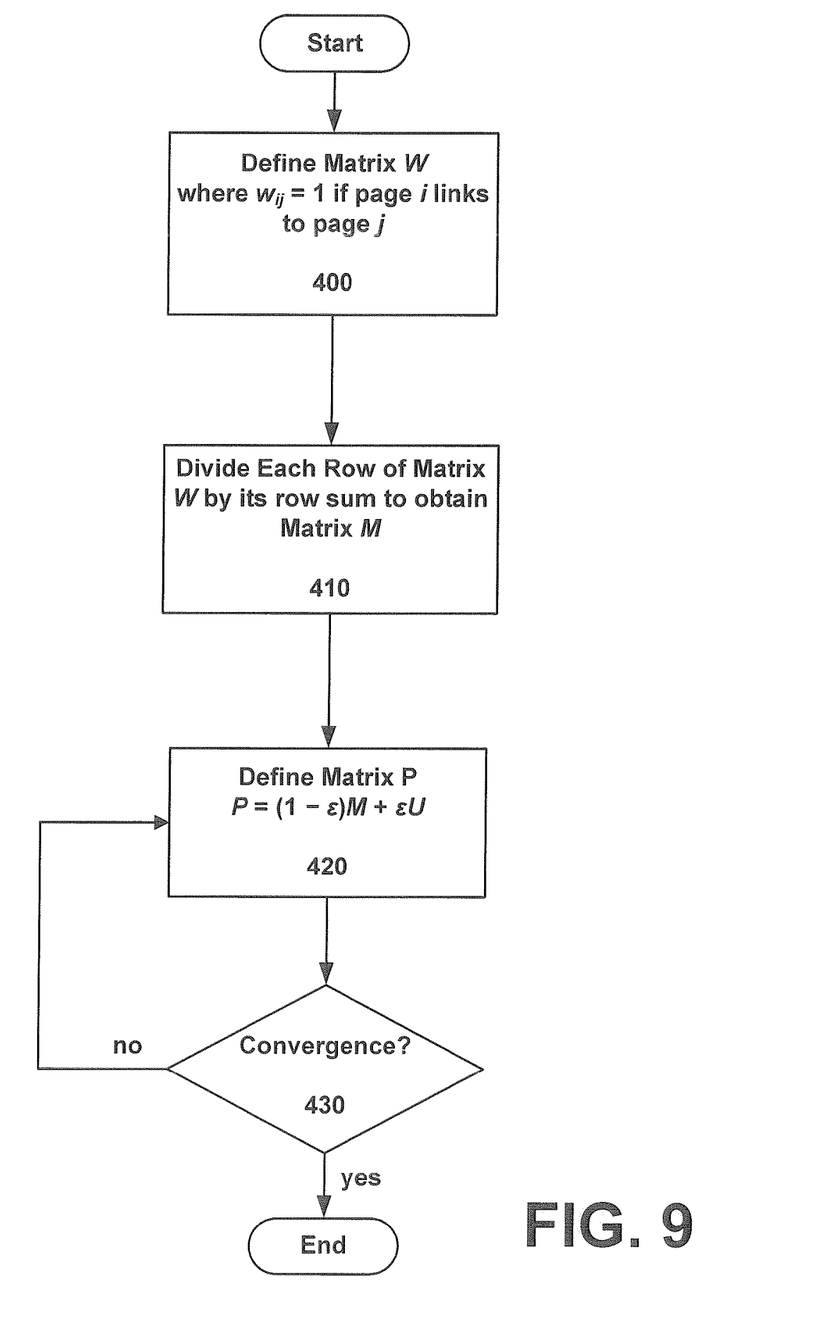
FIG. 9 is a flow chart illustrating a process for assigning scores to web pages.

The modified technique for assigning scores to web pages is illustrated in the flow chart of FIG. 9. In step 400, the adjacency matrix W is defined, as previously described. In step 410, each row of the matrix W is divided by its row sum, also previously described, to obtain matrix M. In step 420, the Markov chain P is defined in terms of a transition matrix U. Each entry $u_{ij}$ in the matrix U has a value of 1 divided by the absolute value of B if page i is linked to by a blog, and B is the set of pages linked to by blogs. This technique is iterative, and if the results converge in step 430, then the process is done. If not, then the process iterates for values of P until convergence is substantially achieved.

Based on observed results, blogspace is an attractive setting for the classical PageRank algorithm, and indeed, blogs ranked highly by PageRank turn out to be frequently updated, more informational rather than personal, and free of spam. Thus, the links that exist in pages identified as blog pages may be used to improve PageRank by biasing the reset vector.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

The invention claimed is:

1. A computer-implemented method for static ranking of web documents, comprising:
    determining a score for each target web page in a collection of web pages by using a query-independent link-based ranking technique having a reset vector that is biased toward web pages linked to by blogs;
    generating by a processor an ordered list of documents from the collection of web pages based on said score determined for each target web page in the collection; and
    outputting by the processor the ordered list of documents to a user in response to a user query, the determining a score comprising:
        defining a matrix W of a web graph for n pages, wherein $w_{ij}=1$ if there is a link from page i to page j;
        obtaining a matrix M by dividing each row of matrix W by its row sum;
        defining a matrix $P=(1-\epsilon)M+\epsilon U$, where U is a uniform transition matrix with $u_{ij}=1/|B|$ for all pages i, j, where page i is linked to by a blog, where $\epsilon$ is a fixed constant, and where B is equal to the set of all pages linked to by blogs; and
    iterating calculations of the matrix P until results converge.

2. The method of claim 1, further comprising:
    identifying by the processor web pages as blogs or non-blogs.

3. The method of claim 2, wherein the identifying step comprises:
    performing a focused crawl of the web to identify blogs based on blog characteristics.

4. The method of claim 2, further comprising:
    performing a general crawl of the web to identify blogs.

5. The method of claim 1, wherein $u_{ij}=1/|B_x|$ for all pages i, j, where page i is linked to by a blog ranked in the top x percent of all blogs, where $\epsilon$ is a fixed constant, and where $B_x$ is equal to the set of pages linked to by blogs in the top x percent of all blogs.

6. The method of claim 5, wherein x is 1%.

7. The method of claim 5, wherein x is 10%.

8. The method of claim 3, wherein one blog characteristic of the blog characteristics includes whether a page is hosted by a known blog hosting DNS (Domain Name Server) domain.

9. The method of claim 3, wherein one blog characteristic of the blog characteristics includes whether features from non-html markup words and phrases are contained in a page.

10. The method of claim 3, wherein one blog characteristic of the blog characteristics includes whether targets of outgoing links are in a page.

11. The method of claim 3, wherein one blog characteristic of the blog characteristics includes whether the string "blog" occurs in a URL.

12. The method of claim 1, wherein the determining a score includes factoring in a number of subscribers to blogs that are linked by target web pages.

13. A computer server, comprising:
    an application programming interface in a processor of the computer server for use with a search engine, whereby a search request submitted by a user to the search engine generates a list of web documents and scores corresponding to the web documents; and
    a scoring module in the processor for generating the scores corresponding to the web documents by using a query-independent link-based ranking technique having a modified reset vector that is biased toward web documents linked to by blogs, said modified reset vector equals $1/|B|$, wherein B is equal to a set of web documents linked to by blogs, and
    wherein said scoring module generates and outputs an ordered list of documents from the list of web documents in response to the search request submitted by the user, the computer server further comprising:
        a first module for defining a matrix W of a web graph for n pages, wherein $w_{ij}=1$ if there is a link from page i to page j;
        a second module for obtaining a matrix M by dividing each row of matrix W by its row sum;

a third module for defining a matrix $P=(1-\epsilon)M+\epsilon U$, where U is a uniform transition matrix with $u_{ij}=1/|B|$ for all pages i, j, where page i is linked to by a blog, where $\epsilon$ is a fixed constant, and where B is equal to the set of all pages linked to by blogs; and a fourth module for iterating calculations of the matrix P until results converge.

14. The computer server of claim 13, wherein the scoring module for generating scores further comprises:

a classifier for evaluating web documents as either blog or non-blog.

15. A computer readable storage medium having stored therein a computer program executable by a processor, the computer program including executable instructions, the instructions comprising:

identifying a collection of web pages that are linked to by blogs;

assigning a score to each web page in the collection using a query-independent link-based ranking technique having a non-uniform reset vector that is biased toward web pages linked to by blogs;

receiving a query from a user;

generating an ordered list of documents from the collection of web pages arranged in descending order of score in response to the user query; and outputting the ordered list of documents to the user, the assigning comprising:

defining a matrix W of a web graph for n pages, wherein $w_{ij}=1$ if there is a link from page i to page j;

obtaining a matrix M by dividing each row of matrix W by its row sum;

defining a matrix $P=(1-\epsilon)M+\epsilon U$, where U is a uniform transition matrix with $u_{ij}=1/|B|$ for all pages i, j, where page i is linked to by a blog, where $\epsilon$ is a fixed constant, and where B is equal to the set of all pages linked to by blogs; and iterating calculations of the matrix P until results converge.

16. The computer server of claim 13, wherein $u_{ij}=1/|B_x|$ for all pages i, j, where page i is linked to by a blog ranked in the top x percent of all blogs, where $\epsilon$ is a fixed constant, and where $B_x$ is equal to the set of pages linked to by blogs in the top x percent of all blogs.

17. The computer readable medium of claim 15, wherein $u_{ij}=1/|B_x|$ for all pages i, j, where page i is linked to by a blog ranked in the top x percent of all blogs, where $\epsilon$ is a fixed constant, and where $B_x$ is equal to the set of pages linked to by blogs in the top x percent all blogs.

* * * * *